No. 744,026. PATENTED NOV. 17, 1903.
E. BERTELSMANN.
ADJUSTABLE BARREL COVER.
APPLICATION FILED FEB. 25, 1903.
NO MODEL. 2 SHEETS—SHEET 1.
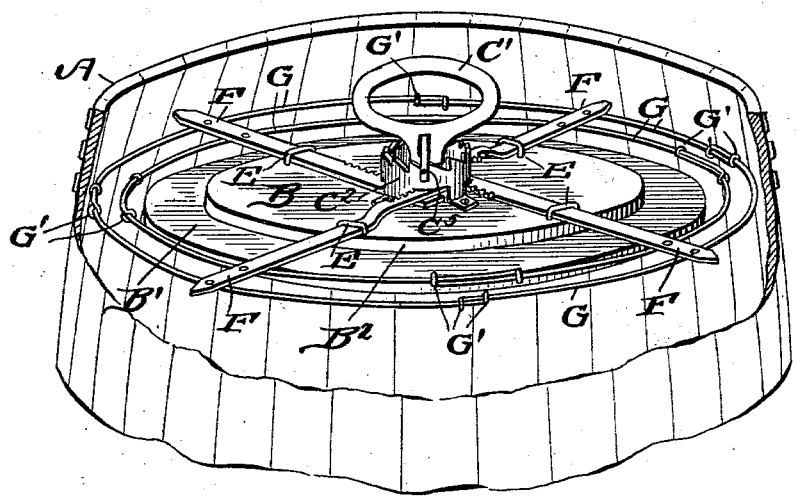
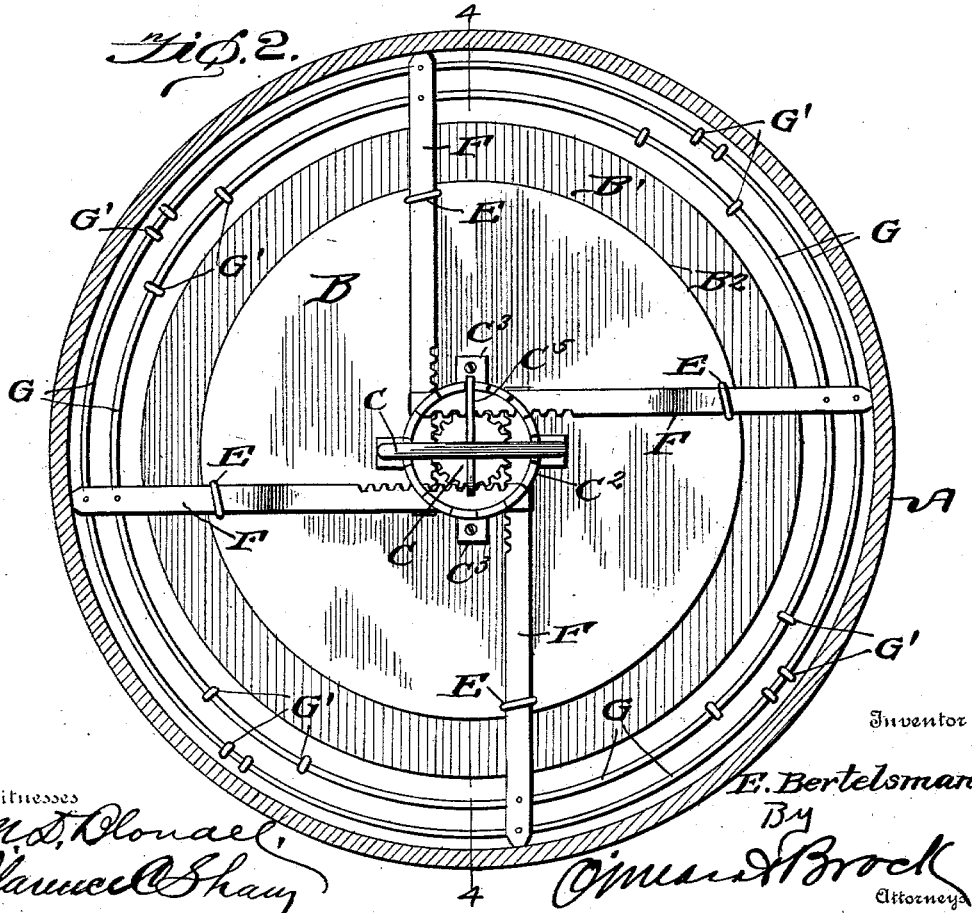
Witnesses
M. D. Clondel
Clarence A. Shay
Inventor
E. Bertelsmann,
By
Omond Brock
Attorneys No. 744,026. PATENTED NOV. 17, 1903.
E. BERTELSMANN.
ADJUSTABLE BARREL COVER.
APPLICATION FILED FEB. 25, 1903.
NO MODEL. 2 SHEETS—SHEET 2.
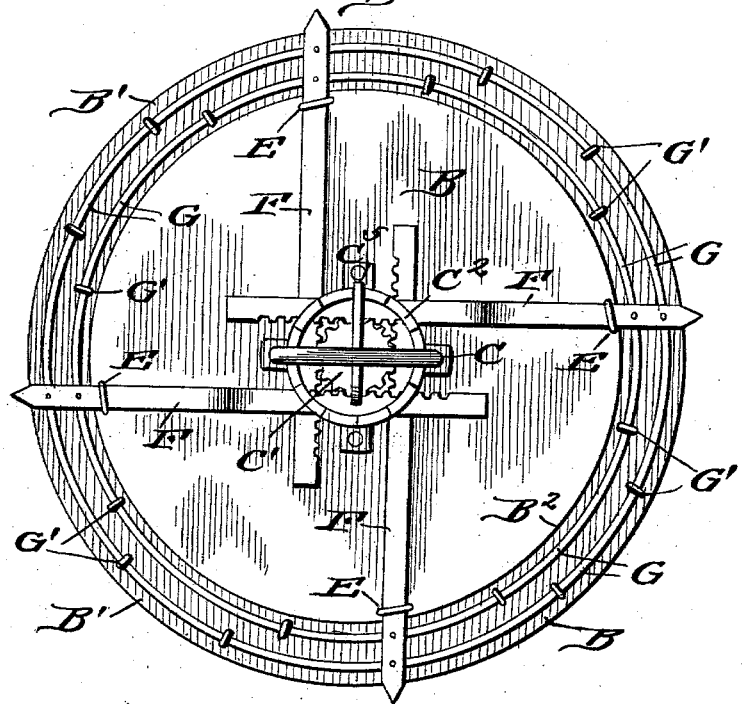
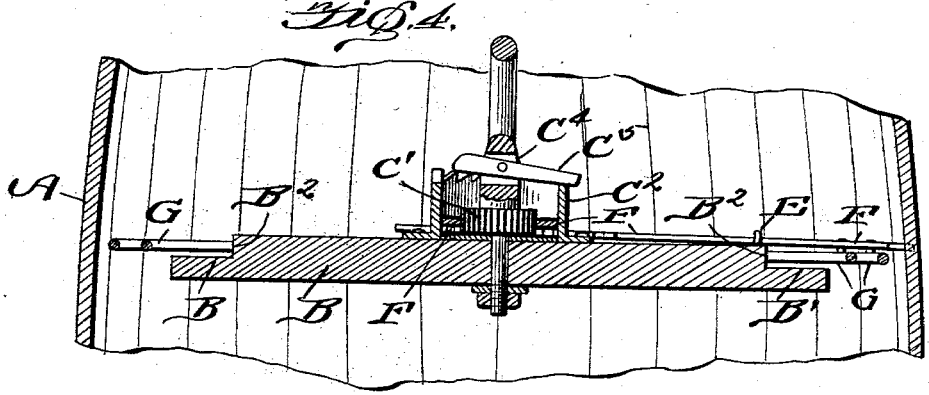
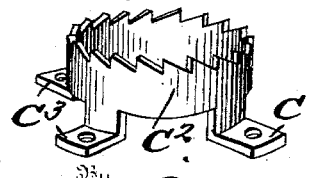

No. 744,026.

Patented November 17, 1903.

UNITED STATES PATENT OFFICE.

EDWARD BERTELSMANN, OF WASHINGTON, MISSOURI.

ADJUSTABLE BARREL-COVER.

SPECIFICATION forming part of Letters Patent No. 744,026, dated November 17, 1903.

Application filed February 25, 1903. Serial No. 145,066. (No model.)

*To all whom it may concern:*

Be it known that I, EDWARD BERTELSMANN, a citizen of the United States, residing at Washington, in the county of Franklin and State of Missouri, have invented a new and useful Adjustable Barrel-Cover, of which the following is a specification.

My invention is an improvement in covers for barrels; and the object of my invention is to produce an adjustable cover adapted to fit barrels of various sizes and also to fit in different portions of the same barrel. The device can also be used on tubs and kegs, and in the following description the word "barrel" will be used as descriptive of any upwardly-open cylindrical receptacle.

It is customary with merchants who handle pickled goods by the barrel—such as fish, kraut, and pickles of all varieties—to place a lid on the top of the commodity contained in the barrel and weight same, so that as the quantity is reduced the weighted lid settles lower in the barrel, holding the upper layers of the goods below the surface of the brine, and thus preventing their spoiling.

In the accompanying drawings, Figure 1 is a perspective view of my improved lid within a barrel, one side of the barrel being broken away. Fig. 2 is a plan view of my device, the barrel being in section. Fig. 3 is a plan view of my device detached from the barrel, showing the expanding rings contracted. Fig. 4 is a section through a portion of the barrel and lid on about the line 4 4 of Fig. 2, parts being in elevation; and Fig. 5 is a detail view of the circular locking-ratchet.

In the above-described drawings, A represents a barrel, and B a lid having a diameter less than the smallest diameter of the barrel. This cover has its upper surface cut away adjacent its periphery, leaving an outer portion B' reduced in thickness and a shoulder $B^2$. Centrally and revolubly mounted on this lid is a cog C, adapted to be rotated by the handle C', which may also be used for lifting the lid. To prevent the handle from being turned accidentally in lifting, a lock is secured to upper side of the lid adjacent the cog. Adjacent the shoulder $B^2$ and equidistant apart are arranged four staples E. Slidably secured in these staples are bars F, preferably of metal and pointed at their outer ends, which ends project beyond the lid. Arranged around the cog C is a metal ring $C^2$, having teeth formed on its upper edge and supported above the lid by integral angled brackets $C^3$, thus allowing the bars to slide beneath it between the brackets. The handle is slotted at $C^4$, and a catch $C^5$ is pivoted in the slot, one end of the catch engaging the teeth and locking the handle and cog C against rotation. The edges of the bars adjacent the cog have rack-teeth formed thereon adapted to be engaged by the cog. As these are arranged at right angles to each adjacent bar, their inner portions form a square, within which the cog revolves, engaging simultaneously the teeth on all the bars, and the inner portion of each bar passes, respectively over and under the inner portion of the bars arranged at right angles to it. Surrounding the lid and adapted to rest on the reduced portion B' are a plurality of sectional wire rings G. These rings are shown as made in four sections, which is the preferred number, though the rings may be made in any number of sections. As shown, each section forms an arc of a circle and overlaps the adjacent sections, the ends of each section being bent to form eyes G', in which the adjacent section slides. It is obvious, therefore, that the sections are slidably secured together and that the diameter of the rings can be increased or decreased at will. These rings are not directly connected to the lid, but are connected to the bars F, between the staples and pointed ends, the rings being spaced a short distance apart.

When a barrel is opened, the lid is laid on the contents, being pressed down as far as desired, and the handle turned, rotating the cog and forcing the bars outward until the prongs engage the sides of the barrel. The rings will then be locked by the pawl engaging the rack $C^2$ and the lid be held firmly in position without the use of weights of any kind, and it is also obvious that as the rings are secured to the bars they will be expanded by the outward movement of the bars. As the contents of the barrel are removed the lid can be pressed farther down and by reason of its adjustability can be expanded to fit the increased diameter of the barrel. When it is desired to remove the lid, reverse rotation of the handle will retract the bars and contract the rings. When the rings are contracted to as small a diameter as possible, the rings will rest on the portion B', the inner ring being adjacent the shoulder B².

Having thus fully described my invention, what I claim as new, and desire to secure by Letters Patent, is—

1. A device of the kind described comprising a lid, bars slidably secured on said lid, adjustable concentric rings surrounding the periphery of the lid, said rings being secured to the bars, and means for actuating the bars.

2. A device of the kind described comprising a lid, a cog centrally mounted thereon, bars having teeth adapted to be engaged by the cog, said bars being slidably held to the lid and adapted to project beyond same, and sectional, expandible rings secured to said bars.

3. A device of the kind described comprising a lid, horizontal bars slidably secured to and projecting beyond said lid, a plurality of sectional rings encircling said lid and secured to said bars, and means for moving said bars inward and outward.

4. A device of the kind described comprising a lid reduced in thickness adjacent its periphery, bars slidably secured to and projecting beyond said lid, a plurality of contractible rings encircling said lid and secured to said bars, said rings being adapted to rest on the reduced portion of the lid when contracted, and means for moving said bars inward and outward.

EDWARD BERTELSMANN.

Witnesses:
A. A. HUPPERT,
MATHIAS ALTEMOELLER.